(12) United States Patent
Woods

(10) Patent No.: US 10,578,208 B2
(45) Date of Patent: Mar. 3, 2020

(54) METHOD OF AVOIDING GEAR TOOTH INTERFERENCE IN A PLANETARY GEAR SYSTEM

(71) Applicant: Bell Helicopter Textron Inc., Fort Worth, TX (US)

(72) Inventor: Ron Woods, Weatherford, TX (US)

(73) Assignee: Textron Innovations Inc., Providence, RI (US)

( * ) Notice: Subject to any disclaimer, the term of this patent is extended or adjusted under 35 U.S.C. 154(b) by 65 days.

(21) Appl. No.: 15/656,420

(22) Filed: Jul. 21, 2017

(65) Prior Publication Data

US 2019/0024779 A1     Jan. 24, 2019

(51) Int. Cl.
| | |
|---|---|
| *F16H 55/08* | (2006.01) |
| *F16H 55/12* | (2006.01) |
| *F16H 57/08* | (2006.01) |
| *F16H 1/28* | (2006.01) |
| *G01M 13/021* | (2019.01) |
| *F16H 57/00* | (2012.01) |

(52) U.S. Cl.
CPC .............. *F16H 57/08* (2013.01); *F16H 1/28* (2013.01); *F16H 55/0806* (2013.01); *G01M 13/021* (2013.01); *F16H 2057/0087* (2013.01)

(58) Field of Classification Search
CPC ........... F16H 55/08; F16H 55/12; G06F 17/50
See application file for complete search history.

(56) References Cited

U.S. PATENT DOCUMENTS

| | | | |
|---|---|---|---|
| 8,777,800 | B2 | 7/2014 | Morel |
| 2010/0256932 | A1 | 10/2010 | Kar |
| 2019/0024780 | A1* | 1/2019 | Ehinger ................... F16H 1/28 |

OTHER PUBLICATIONS

Chen et al, Dyanmic Features of a Planetary Gear System with Tooth Crack Under Different Sizes and Inclination Angles, Jun. 2013. (Year: 2013).*
Lewiciki et al, Rim thickness effects on gear crack propagation life, Nov. 1996, published 1997. (Year: 1997).*
Liang et al, Investigating Vibration Properties of a Planetary Gear Set with a Cracked Tooth in a Planet Gear, published 2014. (Year: 2014).*
Cura et al, Crack propagation behavior in planet gears, Jun. 2016 (Year: 2016).*
Lewicki, David G., "Gear Crack Propagation Studies—Guidelines for Ultra-Safe Design"; U.S. Army Research Laboratory, Glenn Research Center, Cleveland, Ohio; NASA/TM—2001-211073; Jul. 2001; 16 pages.
European Search Report in related European Patent Application No. 17186843.3, dated May 30, 2018, 5 pages.
European Exam Report in related European Patent Application No. 17186843.3, dated Jun. 19, 2018, 6 pages.
European Exam Report in related European Patent Application No. 17186843.3, dated Dec. 17, 2018, 6 pages.

(Continued)

*Primary Examiner* — Tisha D Lewis
(74) *Attorney, Agent, or Firm* — Lightfoot & Alford PLLC

(57) ABSTRACT

A method of avoiding gear tooth interference in a planetary gear system includes designing and building a planetary gear system having a selected base pitch and tooth length for planet gears, breaking a rim of one of the planet gears, and verifying whether tooth tip interference occurs during operation of the planetary gear system.

13 Claims, 3 Drawing Sheets

(56) References Cited

OTHER PUBLICATIONS

European Exam Report in related European Patent Application No. 17186843.3, dated Jun. 21, 2019, 4 pages.
Lewicki, David G., "Crack Propagation Studies to Determine Benign or Catastrophic Failures Modes for Aerospace Thin-Rim Gears," Department of Mechanical and Aerospace Engineering at Case Western Reserve University, UMI Microform 9604656, May 1995 (May 1995).
Chen, et al, "Dynamic Features of a Planetary Gear System With Tooth Crack Under Different Sizes and Inclinations Angles", State Key Laboratory of Mechanical Transmission, at Chongqing University, 400030 China published in Journal of Vibration and Acoustics Jun. 2013, vol. 135/031004-1.
Canadian Exam Report in related Canadian Patent Application No. 3,012,148 dated Apr. 5, 2019, 4 pages.

\* cited by examiner

METHOD OF AVOIDING GEAR TOOTH INTERFERENCE IN A PLANETARY GEAR SYSTEM

BACKGROUND

In planetary gear systems, a planet gear or a pinion gear can fail by fatigue fracture through the gear rim or by gear tooth breakage. In cases where a planet gear tooth breaks off from the planet gear, the planetary gear system can experience a catastrophic failure when the broken tooth remnants become enmeshed between planet gears and the sun gear and/or between the planet gears and the ring gear. In other cases, a failure can occur due to spalling fatigue damage or other defects to integral bearing races that induce fatigue failure through the rim of the gear. This failure mode can cause the planet pinion teeth to catastrophically lock up due to interference with the mating teeth sun or ring gear teeth. While a catastrophic failure of a planetary gear system in some applications may be an expensive inconvenience, such a failure in an aircraft propulsion system, such as, but not limited to, the propulsion system of a helicopter, can lead to fatal crashes and/or significant damage to the aircraft.

DETAILED DESCRIPTION

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
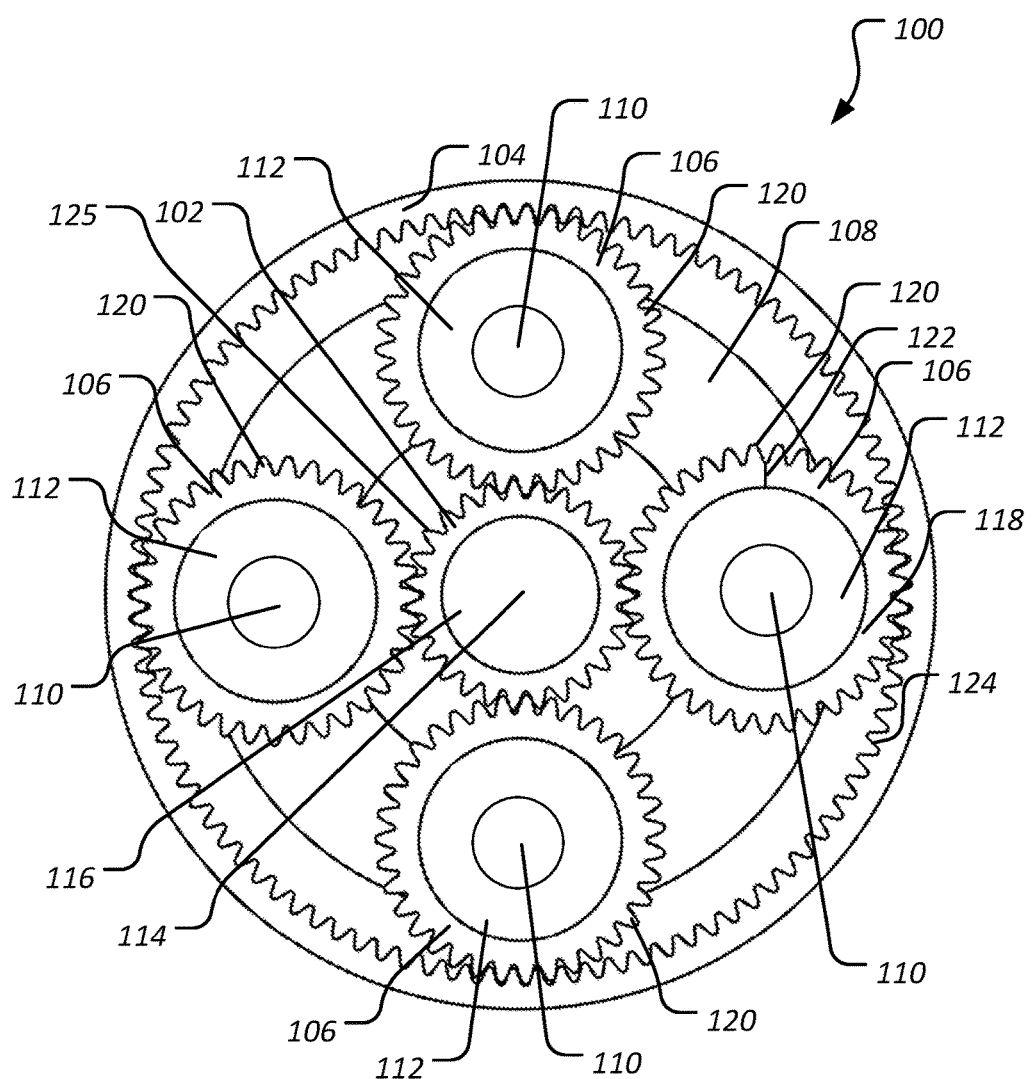
FIG. 1 is an orthogonal top view of a planetary gear system according to an embodiment of this disclosure.

Referring now to FIG. 1, a planetary gear system 100 of the present disclosure is shown. The planetary gear system 100 comprises a sun gear 102, a ring gear 104, and four planet gears 106 (or pinion gears). The four planet gears 106 are carried by a carrier 108. More specifically, the planet gears 106 are rotatably mounted to posts 110 of the carrier 108 using roller bearings 112. Although the planetary gear system 100 can be driven in multiple ways by restricting angular rotation of any one of the sun gear 102, ring gear 104, and the carrier 108, operation of the planetary gear system 100 is described herein for illustration purposes as allowing angular rotation of the sun gear 102 and the carrier 108 about a central axis 114 of a shaft 116 to which the sun gear 102 is mounted. Most generally, with the carrier 108 prevented from rotating about the central axis 114, a clockwise rotation of the shaft 116 and associated sun gear 102 results in the counter-clockwise rotation of the planet gears 106 and clockwise rotation of the carrier 108. In this embodiment, each of the sun gear 102, the ring gear 104, and the planet gears 106 are formed as involute gears so that, when functioning under normal operating conditions and without failure of any of the gears, contact between two gear teeth occurs along a single line of action (or pressure line or line of contact). While conventional planetary gear system are designed with a preference toward breaking teeth off planet gears as a primary mode of failure, the planetary gear system 100 is designed to accommodate a break 122 in a rim 118 of a planet gear 106. The rims 118 can most generally be described as comprising the material of the planet gears 106 that exists radially inward (toward the associated posts 110) from the root circle (comprising a root diameter) of the planet gears 106. More generally, the rims 118 comprise the material of the planet gears 106 that carry planet gear teeth 120.

Still referring to FIG. 1, the planetary gear system 100 is shown with a break 122 (or a through crack). When the planetary gear system 100 operates as described with respect to FIG. 1, the break 122 rotates counter-clockwise about the associated post 110. When the break 122 has passed engagement of the teeth of the sun gear 102 and is approaching the ring gear 104, the ends of the broken rim 118 are in compression so that the broken planet gear 106 generally behaves normally and is not significantly distorted or out of round. However, when the break 122 has passed engagement with the teeth of the ring gear 104 and is approaching the sun gear 102, the forces applied to the broken planet gear 106 by the sun gear 102 and the ring gear 104 tend to separate the ends of the broken rim 118. As a function of the separation, the rim 118 is forced out of round so that the portion of the rim 118 from the break 122 to the interface between the broken planet gear 106 and the ring gear 104 is distorted and may be partially elastically unfurled and/or partially straightened relative to the original circular shape of the rim 118. Even though the unfurling may only be temporary due to the at least partially elastic nature of the bending, the unfurling may alter the meshing characteristics of the planet gear 106 relative to the ring gear 104. While high contact ratio planetary gear systems with relatively longer teeth may experience binding or tooth interference between the broken planet gear 106 and the ring gear 104 or the sun gear 102, the planetary gear system 100 of the present disclosure is designed so that the unfurling is anticipated and accommodated in the size and shape of the planet gear teeth 120 and/or the ring gear teeth 124 of the ring gear 104 and/or the sun gear teeth 125.

One result of accommodating the unfurling of the broken planet gear 106 is that during the unfurling and/or while the broken planet gear 106 is in an unfurled state, the broken planet gear 106 bears a lesser load than under normal conditions. However, because the total load applied to the group of planet gears 106 is not diminished when the broken planet gear 106 at least partially unfurls, the effective force transfer capability of the broken planet gear 106 is realized elsewhere by the unbroken planet gears 106 as a collective increase in load commensurate to that which would normally applied to the broken planet gear 106 prior to breakage. This load redistribution to the other planets creates a self-limiting amount of unfurling the broken planet gear 106 can undergo. In other words, the broken planet gear 106 may at least partially or fully behave as an idler gear that, while still meshing with other gears without destructive interference, contributes less toward transferring load between the sun gear 102 and the ring gear 104. Another potential result of the unfurling of the broken planet gear 106 is that as the number of rotations of the broken planet gear 106 increases, the rim 118 experiences cyclic and repetitive flexure, in some cases with the cyclic stress being concentrated primarily about 180 degrees angularly offset from the initial break 122. Over time, the application of such cyclic stress may lead to fatigue cracking of the already broken planet gear 106 and separation of one portion of the broken planet gear 106 from another, yielding two separate portions. However, because such a potentially catastrophic outcome is anticipated, other systems and methods, such as chip detection systems are utilized to notify an operator of the initial break 122 and/or automatically initiate a reduction in the forces or cycles applied to the broken planet gear 106. The above-mentioned chip detection is a reliable method of determining the initial break 122 because the roller bearings 112 will contact the irregular interface of the break 122 and generate material fragment castoffs from the rim 118 and/or the roller bearings 112 themselves.

Providing planetary gear system 100 with the above-described capability to accommodate a partial unfurling of the rim 118 requires consideration of many geometric, kinematic, and thermodynamic aspects of the components of the planetary gear system 100. Complementary involute gears need to have complementary and specific base pitches as well as diametrical pitches. If an involute profile of an involute gear varies from the appropriate involute path, a transmission error can occur which can result in noise and/or vibration. However, considering that gear teeth generally deflect under load, the involute profile is typically modified so that the implemented involute profile of a gear follows a true involute path under the anticipated deflection. A primary factor in ensuring nondestructive meshing between broken planet gear 106 and the ring gear 104 and the sun gear teeth 125 is to select an appropriate planet gear tooth 120 length. In other words, selecting appropriate tooth dedendums and tooth addendums can greatly affect whether a broken and at least partially unfurled planet gear 106 can mesh with the ring gear 104 or sun gear 102. Further, an unbroken planet gear 106 and a complementary ring gear 104 and sun gear 102 need to comprise substantially the same base pitch to mesh well. However, with sufficient unfurling of the rim 118, the kinematics of the interface between the broken planet gear 106 and the ring gear 104 and sun gear 102 can be sufficiently changed so that the base pitch is different (typically more than the base pitch of the unbroken planet gear 106) and may result in undesirable and destructive tooth tip interference. One way to accommodate the variance in base pitch of the broken planet gear 106 is to shorten the teeth of one or both of the planet gear 106 and the ring gear 104 and sun gear 102.

Figure 2:
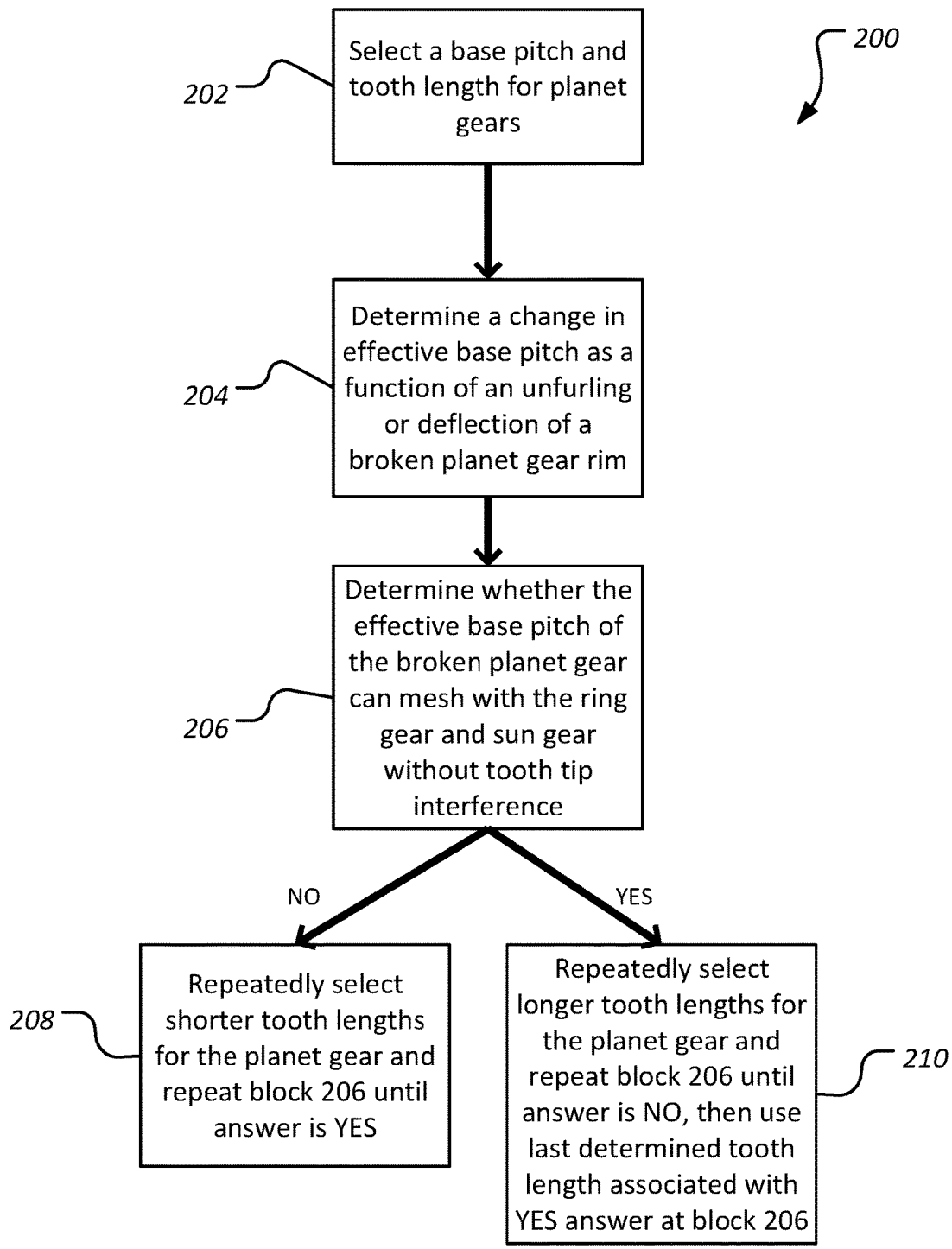
FIG. 2 is a flowchart of a method of avoiding gear tooth interference in a planetary gear system.

Referring now to FIG. 2, a flowchart of a method 200 of avoiding gear tooth interference in a planetary gear system, such as planetary gear system 100, is shown. The method 200 may begin at block 202 by selecting a base pitch and tooth length for planet gears 106 and an associated ring gear 104 and sun gear 102. In some cases, the base pitch may comprise an already utilized or known base pitch. The method 200 may continue at block 204 by determining a change in effective base pitch as a function of an unfurling of a broken rim 118 or deflection of a broken rim 118 of the planet gear 106. In some cases, a predicted maximum change in effective base pitch can be utilized to determine the change in effective base pitch. Next, the method 200 may continue at block 206 by determining whether the effective base pitch of the broken planet gear 106 can mesh with the ring gear 104 and sun gear 102 without tooth tip interference. If the answer at block 206 is no, the tooth length of the planet gear 106 is too long. The method 200 can continue at block 208 to optimize the tooth length of the planet gear 106 by repeatedly selecting shorter planet gear 106 tooth lengths and repeating block 206 until the answer at block 206 is yes. If the answer at block 206 is initially yes, the method 200 can continue at block 210 to optimize the tooth length of the planet gear 106 by repeatedly selecting longer tooth lengths and repeating block 206 until the answer at block 206 is no. Once the answer at block 206 is no, a tooth length associated with a last determined yes answer to block 206 can be selected, thereby optimizing the tooth length and providing a highest tooth contact ratio that is compatible with the predicted maximum change in effective base pitch.

Figure 3:
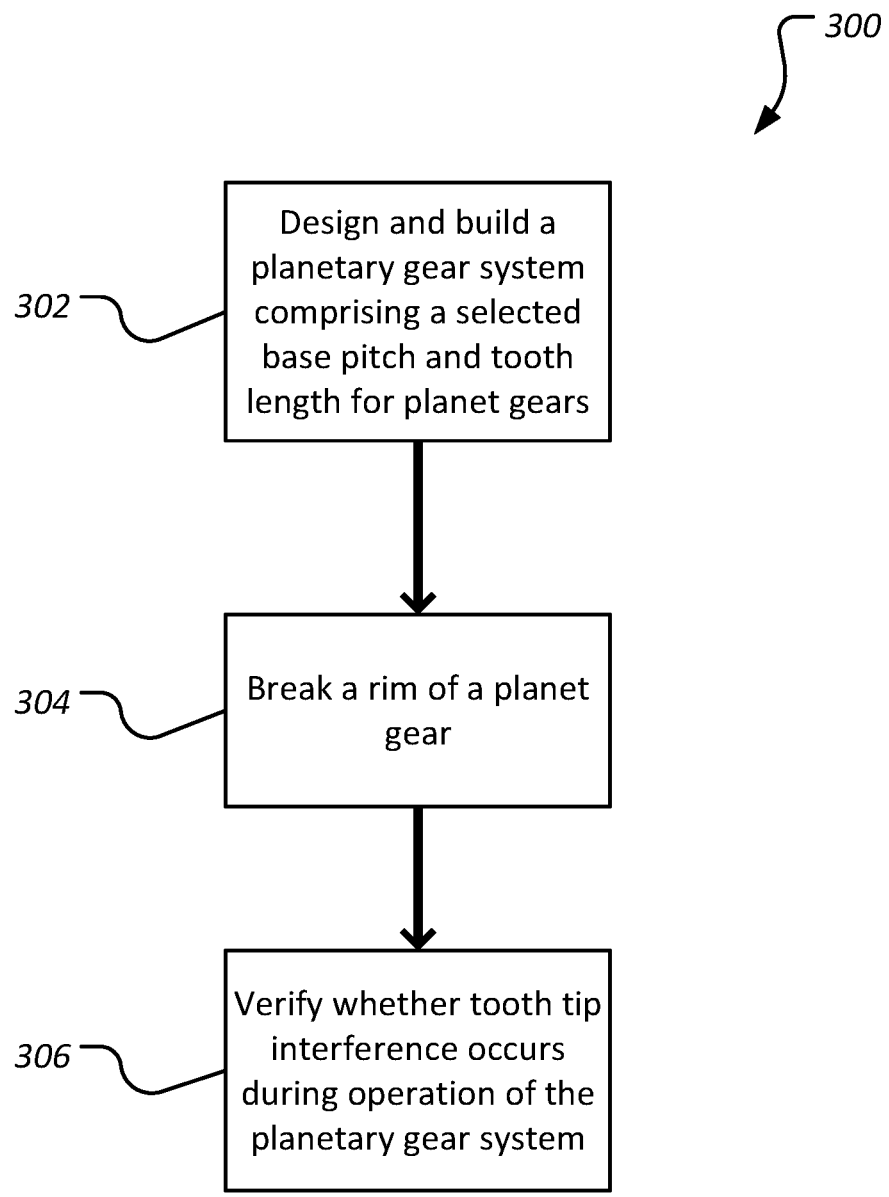
FIG. 3 is a flowchart of another method of avoiding gear tooth interference in a planetary gear system.

Referring now to FIG. 3, a flowchart of a method 300 of avoiding gear tooth interference in a planetary gear system, such as planetary gear system 100, is shown. The method 300 may begin at block 302 by designing and building a planetary gear system 100 comprising a selected base pitch and tooth length for planet gears 106 and an associated ring gear 104. In some cases, the base pitch may comprise an already utilized or known base pitch. The designing and building of the planetary gear system 100 can be accomplished either by physically constructing a tangible physical system or by computer simulation (such as through the use of CATiA software produced by Dassault Systèmes or ANSYS FEM software produced by ANSYS, Inc.). Additional design factors beyond the tooth length and base pitch that affect whether the planetary gear system 100 can accommodate an unfurling rim 118 include, but are not limited to, contact ratio (based in part on tooth height), backlash (based on tooth thickness), cross-sectional stiffness of the rim 118, tooth deflection under load, and typical gear meshing tolerances. The method 300 may continue at block 304 by breaking a rim 118 of a planet gear 106. In cases where block 302 results in a physical embodiment of the planetary gear system 100, breaking the rim 118 can comprise sawing through the rim 118 with a band saw and/or otherwise creating a full angular break 122 in the rim 118 that can allow unfurling of the rim 118. In cases where block 302 is computer simulated, breaking the rim 118 can comprise modeling and/or simulating a full angular break 122 in the rim 118. Next, the method 300 may continue at block 306 by verifying whether tooth tip interference occurs during operation of the planetary gear system 100. In cases where a physical embodiment of the planetary gear system 100 is produced at block 302, the verification of whether tooth tip interference occurs can comprise visual observation, utilization of chip detection systems, and/or any other suitable means of determining whether tooth tip interference has occurred. In cases where a computer simulation is produced at block 302, the verification of whether tooth tip interference occurs can comprise simulating operation of the planetary gear system 100. The simulated operation of the planetary gear system 100 can comprise animated outputs of component kinematic movements (including rim 118 unfurling) and/or other outputs indicating whether tooth tip interference has occurred in the simulation.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A method of avoiding gear tooth interference in a planetary gear system, comprising:
    designing and building a planetary gear system comprising a selected base pitch and tooth length for planet gears;
    breaking a rim of one of the planet gears; and
    verifying whether tooth tip interference occurs during operation of the planetary gear system;
    wherein breaking the rim comprises providing a full angular break in the rim that allows unfurling of the rim and wherein the breaking of the rim comprises sawing the rim using a band saw.

2. The method of claim 1, wherein breaking the rim comprises modelling and/or simulating a full angular break in the rim that can allow unfurling of the rim.

3. The method of claim 1, wherein the verifying comprises simulating operation of the planetary gear system.

4. The method of claim 1, wherein the verifying comprises use of a chip detection system.

5. The method of claim 1, wherein the verifying comprises visual inspection.

6. A method of avoiding gear tooth interference in a planetary gear system, comprising:
    selecting a base pitch and tooth length for planet gears;
    determining a changed effective base pitch as a function of an unfurling or deflection of a broken planet gear rim; and
    determining whether the changed effective base pitch of the broken planet gear can mesh with the ring gear and sun gear without tooth tip interference.

7. The method of claim 6, further comprising:
    in response to determining that the changed effective base pitch of the broken planet gear cannot mesh with the ring gear and sun gear without tooth tip interference, selecting a shorter tooth length.

8. The method of claim 7, further comprising:
    after selecting the shorter tooth length, determining whether the changed effective base pitch of the broken planet gear can mesh with the ring gear and sun gear without tooth tip interference.

9. The method of claim 6, further comprising:
    in response to determining that the changed effective base pitch of the broken planet gear can mesh with the ring gear and sun gear without tooth tip interference, selecting a longer tooth length.

10. The method of claim 9, further comprising:
    after selecting the longer tooth length, determining whether the changed effective base pitch of the broken planet gear can mesh with the ring gear and sun gear without tooth tip interference.

11. A planetary gear set, comprising:
    a sun gear comprising sun gear teeth;
    a ring gear comprising ring gear teeth; and
    a plurality of planet gears comprising planet gear teeth;
    wherein a base pitch and a tooth length of the planet gears are selected to accommodate a partial unfurling of a rim of one of the planet gears without causing tooth tip interference with the ring gear or the sun gear;
    wherein the unfurling is accomplished as a function of a full angular break in the rim and wherein the full angular break is formed in the rim comprises a saw cut.

12. The planetary gear set of claim 11, wherein the unfurling comprises an elastic bending of the rim.

13. The planetary gear set of claim 12, wherein the sun gear, the ring gear, and the plurality of planet gears comprise involute gears.

* * * * *